United States Patent
Choi et al.

(10) Patent No.: US 8,669,003 B2
(45) Date of Patent: Mar. 11, 2014

(54) LITHIUM SECONDARY BATTERY IMPROVED SAFETY AND CAPACITY

(75) Inventors: Byungjin Choi, Daejeon (KR); Hyang Mok Lee, Seoul (KR); Chang bum Ahn, Daejeon (KR); Wooyong Lee, Daejeon (KR); Sung-Min Hwang, Seoul (KR); Oh Young Hyun, Daejeon (KR)

(73) Assignee: LG Chem, Ltd. (KR)

( * ) Notice: Subject to any disclaimer, the term of this patent is extended or adjusted under 35 U.S.C. 154(b) by 404 days.

(21) Appl. No.: 12/225,982

(22) PCT Filed: Mar. 28, 2007

(86) PCT No.: PCT/KR2007/001510
§ 371 (c)(1),
(2), (4) Date: Nov. 19, 2009

(87) PCT Pub. No.: WO2007/114579
PCT Pub. Date: Oct. 11, 2007

(65) Prior Publication Data
US 2010/0055558 A1    Mar. 4, 2010

(30) Foreign Application Priority Data
Apr. 3, 2006 (KR) .................. 10-2006-0029965

(51) Int. Cl.
*H01M 2/02* (2006.01)
(52) U.S. Cl.
USPC .......................................... 429/163
(58) Field of Classification Search
None
See application file for complete search history.

(56) References Cited

U.S. PATENT DOCUMENTS

| 6,451,484 | B1 | 9/2002 | Han et al. |
| 2003/0017388 | A1* | 1/2003 | Furusaki ............... 429/162 |
| 2003/0170535 | A1 | 9/2003 | Watanabe et al. |
| 2004/0038125 | A1 | 2/2004 | Kim et al. |
| 2004/0038126 | A1 | 2/2004 | Gu |

FOREIGN PATENT DOCUMENTS

| KR | 2001-0082053 A | 8/2001 |
| KR | 2001-0082058 A | 8/2001 |
| KR | 2001-0082059 A | 8/2001 |
| KR | 2001-0082060 A | 8/2001 |
| KR | 2003-0040812 A | 5/2003 |
| KR | 2005-0096288 A | 10/2005 |
| WO | 2005/074054 A1 | 8/2005 |

* cited by examiner

*Primary Examiner* — Patrick Ryan
*Assistant Examiner* — Wyatt McConnell
(74) *Attorney, Agent, or Firm* — Lerner, David, Littenberg, Krumholz & Mentlik, LLP

(57) ABSTRACT

Disclosed herein is a secondary battery having an electrode assembly constructed in a structure in which a plurality of electrodes are stacked, while separators are disposed respectively between the electrodes, and electrode taps of the electrodes are connected with each other, the electrode assembly being mounted in a battery case, wherein regions where the electrode taps are coupled to electrode leads (electrode tap-electrode lead coupling regions) are located at an upper-end contact region of the battery case, and the contact region is bent in the thickness direction of the battery, whereby the electrode assembly is separated from an inner space of the battery case.

14 Claims, 8 Drawing Sheets

US 8,669,003 B2

LITHIUM SECONDARY BATTERY IMPROVED SAFETY AND CAPACITY

FIELD OF THE INVENTION

The present invention relates to a lithium secondary battery having increased safety and capacity, and, more particularly, to a secondary battery having an electrode assembly constructed in a structure in which a plurality of electrodes are stacked, while separators are disposed respectively between the electrodes, and electrode taps of the electrodes are connected with each other, the electrode assembly being mounted in a battery case, wherein regions where the electrode taps are coupled to electrode leads (electrode tap—electrode lead coupling regions) are located at an upper-end contact region of the battery case, and the contact region is bent in the thickness direction of the battery, whereby the electrode assembly is separated from an inner space of the battery case.

BACKGROUND OF THE INVENTION

As mobile devices have been increasingly developed, and the demand of such mobile devices has increased, the demand for batteries has also sharply increased as an energy source for the mobile devices. Also, much research on batteries satisfying various needs has been carried out.

In terms of the shape of batteries, the demand of prismatic secondary batteries or pouch-shaped secondary batteries, which are thin enough to be applied to products, such as mobile phones, is very high. In terms of the material for batteries, the demand of lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and anodes are wound while separators are disposed respectively between the cathodes and the anodes, a stacking type structure in which pluralities of cathodes and anodes having a predetermined size are successively stacked one on another while separators are disposed respectively between the cathodes and the anodes, or a stacking/folding type structure in which pluralities of cathodes and anodes having a predetermined size are successively stacked one on another while separators are disposed respectively between the cathodes and the anodes to constitute a bi-cell or a full-cell, and then the bi-cell or the full-cell is wound.

Recently, much interest has been taken in a pouch-shaped battery constructed in a structure in which such a stacking or stacking/folding type electrode assembly mounted in a pouch-shaped battery case made of an aluminum laminate sheet because of low manufacturing costs, light weight, and easy modification in shape. As a result, the use of the pouch-shaped battery has gradually increased.

FIG. 1 is an exploded perspective view typically illustrating the general structure of a conventional pouch-shaped secondary battery 10.

Referring to FIG. 1, the pouch-shaped secondary battery 10 includes an electrode assembly 30, pluralities of electrode taps 40 and 50 extending from the electrode assembly 30, electrode leads 60 and 70 welded to the electrode taps 40 and 50, respectively, and a battery case 20 for receiving the electrode assembly 30.

The electrode assembly 30 is a power generating element comprising cathodes and anodes successively stacked one on another while separators are disposed respectively between the cathodes and the anodes. The electrode assembly 30 is constructed in a stacking structure or a stacking/folding structure. The electrode taps 40 and 50 extend from corresponding electrode plates of the electrode assembly 30. The electrode leads 60 and 70 are electrically connected to the electrode taps 40 and 50 extending from the corresponding electrode plates of the electrode assembly 30, respectively, for example, by welding. The electrode leads 60 and 70 are partially exposed to the outside of the battery case 20. To the upper and lower surfaces of the electrode leads 60 and 70 is partially attached insulative film 80 for improving sealability between the battery case 20 and the electrode leads 60 and 70 and, at the same time, for securing electrical insulation between the battery case 20 and the electrode leads 60 and 70.

The battery case 20 is made of an aluminum laminate sheet. The battery case 20 has a space defined therein for receiving the electrode assembly 30. The battery case 20 is formed generally in the shape of a pouch. In the case that the electrode assembly 30 is a stacking type electrode assembly as shown in FIG. 1, the inner upper end of the battery case 20 is spaced apart from the electrode assembly 30 such that the plurality of cathode taps 40 and the plurality of anode taps 50 can be coupled to the electrode leads 60 and 70, respectively.

FIG. 2 is an enlarged view, in part, illustrating the inner upper end of the battery case of the secondary battery shown in FIG. 1, in which the cathode taps are coupled to each other in a concentrated state and connected to the cathode lead, and FIG. 3 is a front see-through view illustrating the secondary battery of FIG. 1 in an assembled state.

Referring to these drawings, the plurality of cathode taps 40, which extend from cathode collectors 41 of the electrode assembly 30, are connected to one end of the cathode lead 60, for example, in the form of a welded bunch constituted by integrally combining the cathode taps 40 with each other by welding. The cathode lead 60 is sealed by the battery case 20 while the other end 61 of the cathode lead 60 is exposed to the outside of the battery case 20. Since the plurality of cathode taps 40 are integrally combined with each other to constitute the welded bunch, the inner upper end of the battery case 20 is spaced a predetermined distance from the upper end surface of the electrode assembly 30, and the cathode taps 40 combined in the form of the welded bunch are bent approximately in the shape of V. Accordingly, the coupling region between the electrode taps and the corresponding electrode leads may be referred to as "V-form regions."

However, such V-form regions have several problems in the aspect of capacity and safety of the battery. First, the capacity of the battery depends on the size of the electrode assembly 30. However, the V-form regions restrict the size of the electrode assembly 30 mounted in the battery case 20 with the result that the capacity of the battery is decreased. Specifically, as shown in FIG. 3, the distance $L_1$ between the upper end of the electrode assembly 30 and the insulation film 80 is very large, and therefore, the size of the electrode assembly 30 is inevitably decreased by the distance between the upper end of the electrode assembly 30 and the insulation film 80.

Also, when the battery drops with the upper end of the battery, i.e., the cathode lead 60 of the battery, down, or an external physical force is applied to the upper end of the battery, however, the electrode assembly 30 moves toward the inner upper end of the battery case 20, or the upper end of the battery case 20 is crushed. As a result, the anode of the electrode assembly 30 is brought into contact with the cathode taps 42 or the cathode lead 60, and therefore, short circuits may occur inside the battery. Consequently, the safety of the battery is greatly lowered. Especially, such internal short circuits occur due to the contact between some of the cathode taps below the welded bunch and the outermost anodes.

Consequently, there is high necessity for a technology that is capable of fundamentally solving the above-mentioned problems.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when electrode tap—electrode lead coupling regions are located at an upper-end contact region of a battery case of a secondary battery having an electrode assembly mounted in the battery case, not in a space of the battery case above the upper end of the electrode assembly, and the contact region of the battery case is bent, the occurrence of internal short circuits of the secondary battery according to the present invention due to external impacts, such as vibration or dropping, is effectively prevented, thereby further improving the safety of the secondary battery according to the present invention, and the inner space of the battery case is maximally utilized, whereby the secondary battery according to the present invention has a capacity higher than conventional secondary batteries having the same size as the secondary battery according to the present invention. The present invention has been completed based on these findings.

In accordance with one aspect of the present invention, the above and other objects can be accomplished by the provision of a secondary battery having an electrode assembly constructed in a structure in which a plurality of electrodes are stacked, while separators are disposed respectively between the electrodes, and electrode taps of the electrodes are connected with each other, the electrode assembly being mounted in a battery case, wherein regions where the electrode taps are coupled to electrode leads (electrode tap—electrode lead coupling regions) are located at an upper-end contact region of the battery case, and the contact region is bent in the thickness direction of the battery, whereby the electrode assembly is separated from an inner space of the battery case.

In a preferred embodiment of the present invention, the contact region is a region where the upper ends of upper and lower case members constituting the battery case are in contact with each other. Specifically, the contact region is a region where the upper and lower case members are in contact with each other along the edge of the battery case such that the battery case is sealed while the electrode assembly is mounted in the battery case. The contact region may extend vertically from the upper-side edge or lower-side edge thereof about the stacked section of electrodes of the electrode assembly. In the specification, the contact region located at a position corresponding to the electrode assembly about the upper end of the electrode assembly, from which the electrode taps protrude, is referred to as an "upper-end contact region."

In a preferred embodiment, the electrode tap—electrode lead coupling regions are regions where the plurality of electrode taps, which are integrally coupled with each other, are coupled to the corresponding electrode leads. The coupling regions may be disposed adjacent to thermal welding parts where thermal welding is carried out to seal the battery case at the upper-end contact region of the battery case. Specifically, the coupling regions may be disposed at the upper-end contact region of the battery case between the upper case member and the lower case member. For example, when thermal welding is carried out at the upper part of the upper-end contact region, the cathode tap—cathode lead coupling region and the anode tap—anode lead coupling region may be located on the contact interface between the upper case member and the lower case member at the lower part of the contact region. Due to this structure, the electrode leads are located between the upper case member and the lower case member while the ends of the electrode leads opposite to the coupling regions are partially exposed from the battery case.

As previously described, the thermal welding parts may be formed along the edge of the battery case at the upper part of the contact region about the electrode tap—electrode lead coupling regions. According to circumstances, the thermal welding parts may be also formed in the lateral direction as well as the upper part of the electrode tap—electrode lead coupling regions. For example, the thermal welding parts may be formed at the outside region (a) of the cathode tap—cathode lead coupling region, at the outside region (b) of the anode tap—anode lead coupling region, and the middle region (c) between the electrode tap—electrode lead coupling regions. Alternatively, the thermal welding parts may be formed at the outside region (a) of the cathode tap—cathode lead coupling region and the outside region (b) of the anode tap—anode lead coupling region, or at the middle region (c) between the electrode tap—electrode lead coupling regions. When thermal welding is carried out at most of the contact region excluding the electrode tap—electrode lead coupling regions as described above, the sealability of battery case is increased, and the structural stability of the battery case against an external force applied to the battery case is further improved.

According to a preferred structure, the thermal welding parts and the electrode leads may be vertically bent again in the longitudinal direction of the battery at the upper-end contact region of the battery case, which is primarily bent in the thickness of the battery. Specifically, when the contact region is constructed in a structure in which the contact region extends vertically from the lower-side edge thereof about the stacked section of the electrodes of the electrode assembly, the contact region may be vertically bent such that the electrode tap—electrode lead coupling regions are parallel with the thickness direction of the battery, and then may be vertically bent such that the electrode leads and the thermal welding parts are parallel with the longitudinal direction of the battery. In this case, the electrode leads protrude from the upper end of the electrode such that the electrode leads are perpendicular to the upper end of the electrode, and therefore, a protection circuit module of the battery may be connected to the electrode leads in the longitudinal direction of the battery.

According to another preferred structure, the thermal welding parts and the electrode leads may be horizontally bent again in the thickness direction of the battery at the upper-end contact region of the battery case, which is primarily bent in the thickness of the battery. Specifically, when the contact region is constructed in a structure in which the contact region extends vertically from the lower-side edge thereof about the stacked section of the electrodes of the electrode assembly, the contact region may be vertically bent such that the electrode tap—electrode lead coupling regions are parallel with the thickness direction of the battery, and then may be horizontally bent such that the electrode leads and the thermal welding parts are parallel with the thickness direction of the battery. In this case, the electrode leads protrude from the upper end of the electrode such that the electrode leads are parallel with the upper end of the electrode, and therefore, a protection circuit module of the battery may be connected to the electrode leads in the thickness direction of the battery.

Preferably, insulative films are disposed at the upper-end contact region of the battery case, such that the insulative films surround the electrode taps, the electrode leads, and the top and bottom of the coupling regions between the electrode taps and the electrode leads, for improving sealability between the electrode taps and the electrode leads and the battery case and, at the same time, for securing electrical insulation between the electrode taps and the electrode leads and the battery case.

According to the present invention, the electrode assembly is not particularly restricted so long as the electrode assembly is constructed in a structure in which a plurality of electrode taps are connected with each other to constitute cathodes and anodes. Preferably, the electrode assembly is constructed in a stacking or stacking/folding type structure. The details of the stacking/folding type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent publications are hereby incorporated by reference as if fully set forth herein.

The electrode assembly is basically constructed in a structure in which the cathodes and the anodes are sequentially stacked one on another while separators are disposed respectively between the cathodes and the anodes. According to circumstances, the separators may have a length enough that the ends of the separators are adjacent to the upper-end contact region or partially overlap with the upper-end contact region, whereby the safety of the battery is further improved.

The electrode taps may be connected with each other in various manners. Preferably, the electrode taps are more stably connected with each other by welding.

Preferably, the secondary battery according to the present invention is a battery having an electrode assembly impregnated with a lithium-containing electrolyte in the form of a gel, a so-called a lithium ion polymer battery.

Also preferably, the secondary battery according to the present invention is a pouch-shaped battery having an electrode assembly mounted in a pouch-shaped case made of a laminate sheet including a metal layer and a resin layer, specifically, an aluminum laminate sheet.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 4:
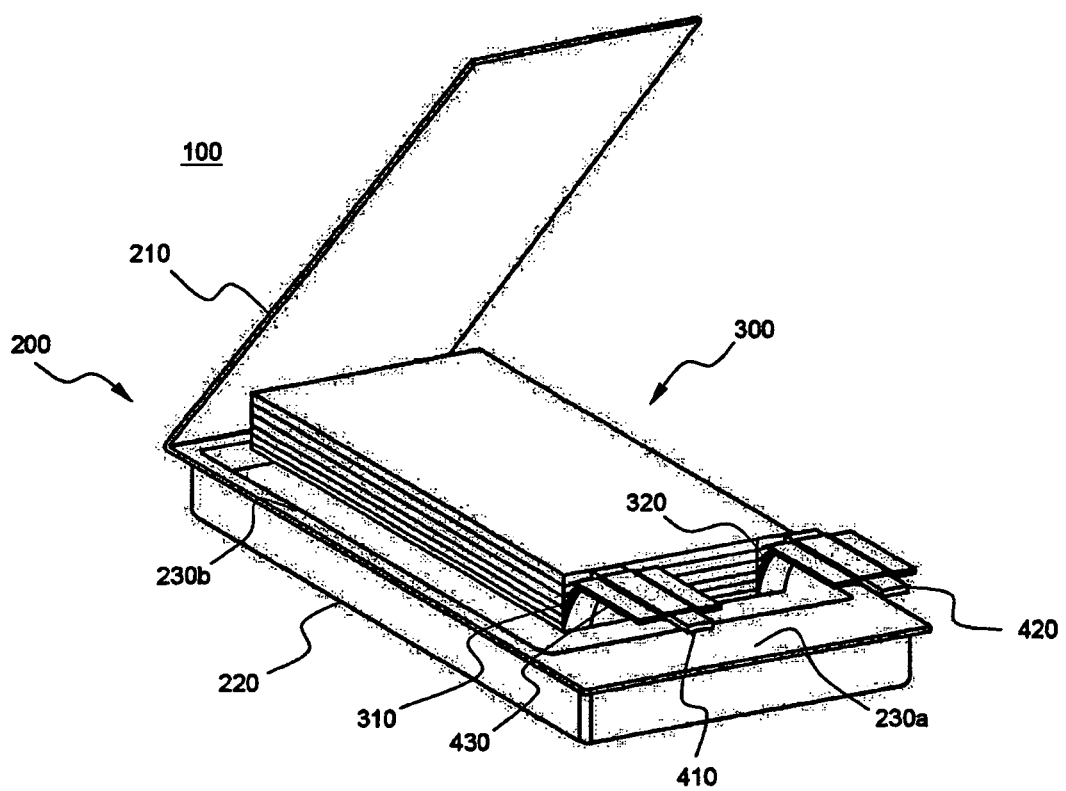
FIG. 4 is an exploded perspective view illustrating a pouch-shaped secondary battery according to a preferred embodiment of the present invention.
Figure 5:
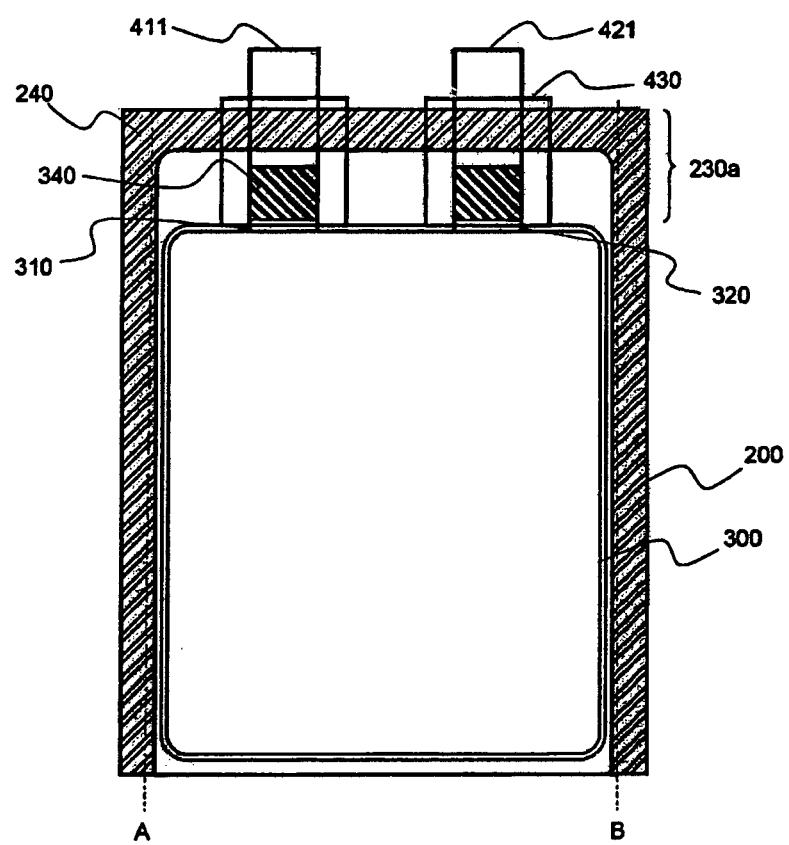
FIG. 5 is a front see-through view illustrating upper-end and side contact regions of a battery case, in which an electrode assembly is mounted, of the pouch-shaped secondary battery of FIG. 4 in a state in which the upper-end and side contact regions of the battery case are sealed.

FIG. 4 is an exploded perspective view illustrating a pouch-shaped secondary battery according to a preferred embodiment of the present invention, and FIG. 5 is a front see-through view illustrating upper-end and side contact regions of a battery case, in which an electrode assembly is mounted, of the pouch-shaped secondary battery of FIG. 4 in a state in which the upper-end and side contact regions of the battery case are sealed.

Referring to these drawings, the pouch-shaped secondary battery 100 includes an electrode assembly 300 having cathode taps 310 and anode taps welded to a cathode lead 410 and an anode lead 420, respectively, and a battery case 200 for receiving the electrode assembly 300.

The battery case 200 includes a lower case member 220 formed in a shape suitable for receiving the electrode assembly 300 and an upper case member 210 integrally connected to the lower case member 220 at one side thereof such that the upper case member 210 serves as a cover. The battery case 200 further includes contact regions 230a and 230b at which the upper case member 210 and the lower case member 220 are brought into tight contact with each other during the assembly of the battery case 200.

The contact regions 230a and 230b include an upper-end contact region 230a corresponding to the upper end of the electrode assembly 300, from which the electrode taps 310 and 320 protrude, and side contact regions 230b corresponding to opposite sides of the electrode assembly 300. Also, the contact regions 230a and 230b include thermal welding parts 240 where a thermal welding operation is carried out to seal the battery case 200. Specifically, the upper-end contact region 230a is partially thermally welded, whereas the side contact regions 230b are wholly thermally welded.

Meanwhile, the plurality of cathode taps 310, which protrude from the electrode assembly 300, are coupled with each other by welding. Similarly, the plurality of anode taps 320, which also protrude from the electrode assembly 300, are coupled with each other by welding. Also, the upper ends 411 and 421 of the cathode and anode taps 310 and 320 are coupled to the cathode and anode leads 410 and 420, which are exposed from the battery case 200, by welding. The coupling regions 340 between the upper ends 411 and 421 of the cathode and anode taps 310 and 320 and the cathode and anode leads 410 and 420 are located at the upper-end contact region 230a between the upper case member 210 and the lower case member 220. The coupling regions 340 do not overlap with the thermal welding parts 240.

At the electrode taps 310 and 320, the electrode leads 410 and 420, and the coupling regions 340 are disposed insulative films 430 which surround the electrode taps 310 and 320, the electrode leads 410 and 420, and the coupling regions 340 for maintaining the sealability of the battery case 200 and preventing the occurrence of short circuits during bending and thermal welding. The opposite sides of the thermal welding parts 240 are vertically bent along dotted lines A and B such that the volume of the battery is minimized after the thermal welding.

Figure 6:
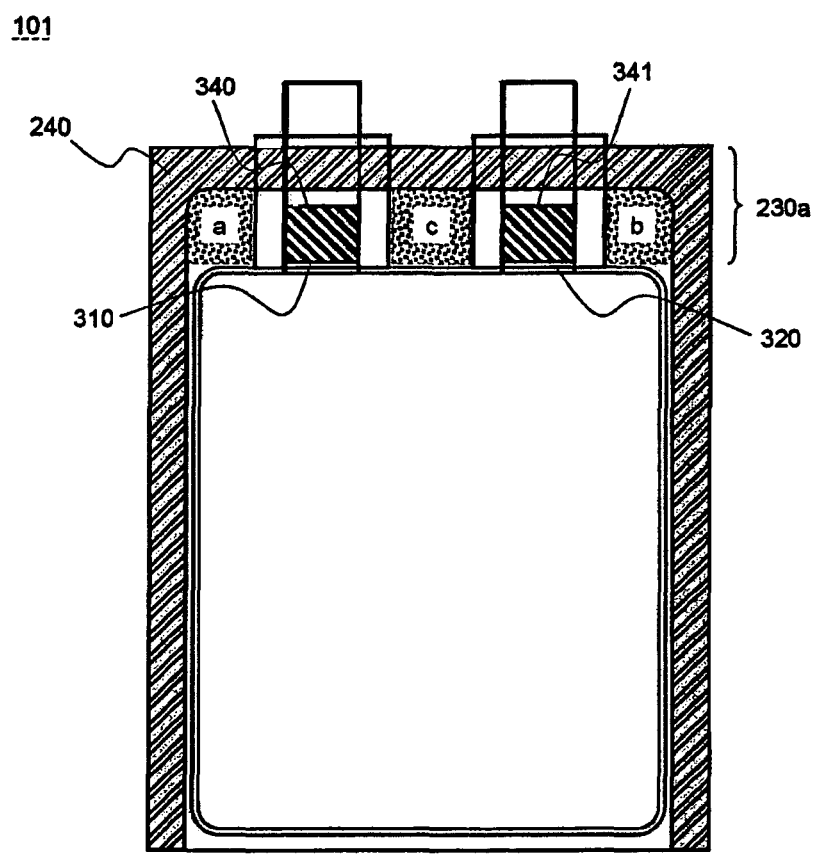
FIG. 6 is a front see-through view illustrating upper-end and side contact regions of a battery case, in which an electrode assembly is mounted, of a pouch-shaped secondary battery according to another preferred embodiment of the present invention in a state in which the upper-end and side contact regions of the battery case are sealed.

FIG. 6 is a front see-through view illustrating upper-end and side contact regions of a battery case, in which an electrode assembly is mounted, of a pouch-shaped secondary battery according to another preferred embodiment of the present invention in a state in which the upper-end and side contact regions of the battery case are sealed.

The secondary battery 101 shown in FIG. 6 is identical in general construction to the secondary battery 100 shown in FIGS. 4 and 5; however, the secondary battery 101 is different from the secondary battery 100 in that thermal welding is performed at most of the upper-end contact region 230a excluding the coupling regions 340 between the electrode taps 310 and 320 and the electrode leads 410 and 420. When comparing with FIG. 5, therefore, the secondary battery 101 is different from the secondary battery 100 in that the thermal welding is carried out at the outside regions a and b of the cathode and anode coupling regions 340 and 341 and the middle region c between the coupling regions 340 and 341 as well as the thermal welding parts 240. According to circumstances, the thermal welding may be carried out only at the outside regions a and b or the middle region c.

Most of the upper contact region 230a is thermally welded as described above, whereby the sealability of the battery case is further increased, and the structural stability of the battery case against an external force is greatly improved.

Figure 7:
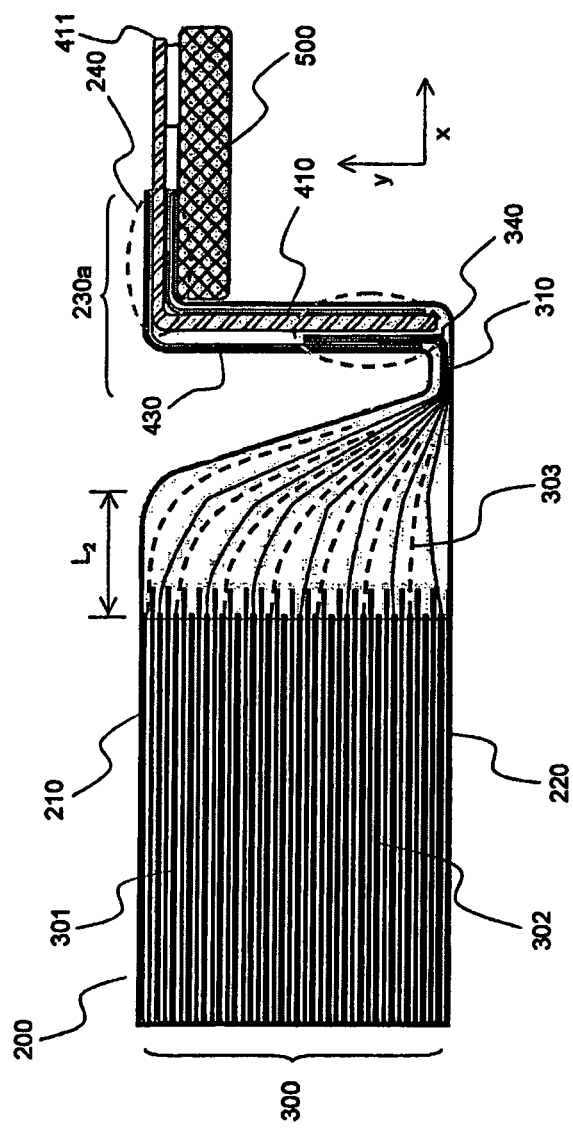
FIG. 7 is an enlarged view, in part, illustrating the upper-end contact region of the battery case of the pouch-shaped secondary battery shown in FIG. 5, in which the coupling region between electrode taps and electrode leads is located according to a preferred structure.
Figure 8:
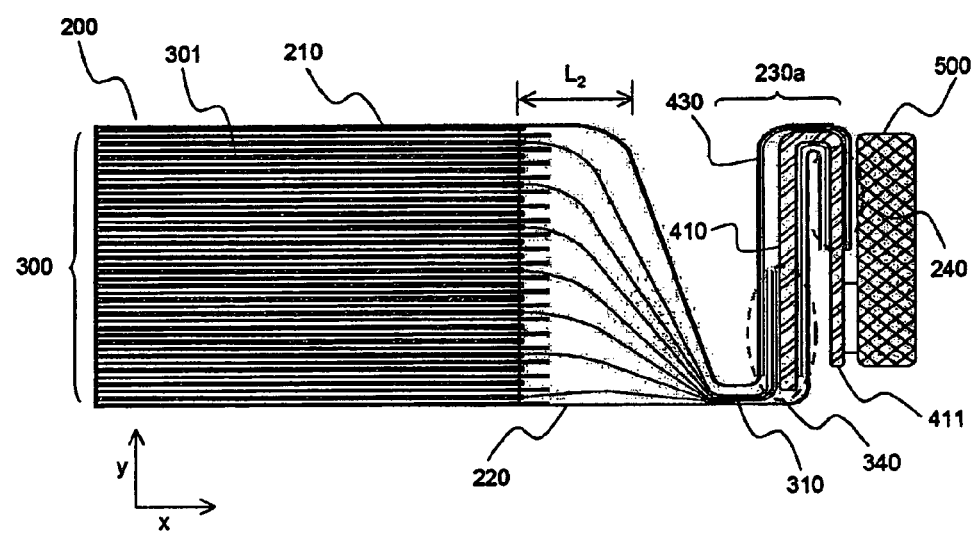
FIG. 8 is an enlarged view, in part, illustrating the upper-end contact region of the battery case of the pouch-shaped secondary battery shown in FIG. 5 according to another preferred structure.

FIG. 7 is a partial sectional view typically illustrating the upper-end contact region of a battery case according to a preferred embodiment of the present invention, and FIG. 8 is a partial sectional view typically illustrating the upper-end contact region of a battery case according to another preferred embodiment of the present invention. For easy understanding, a space region between the upper end of the electrode assembly and the battery case is drawn somewhat exaggerated. It should be noted, however, that the space region may be very small or not provided according to the structure of the present invention.

Referring to these drawings, the secondary battery 100 is manufactured by sealing the battery case 200, while the electrode assembly 300 is mounted in the battery case 200, and vertically bending the upper-end contact region 230a of the battery case 200 in the thickness direction y of the secondary battery 100. Since the cathode lead 411 protruding from the upper-end contact region 230a is to be electrically connected to the outside (for example, a protection circuit module), a part of the upper-end contact region 230a, including the cathode lead 411, is vertically or horizontally bent again, which will be described hereinafter in more detail.

Figure 1:
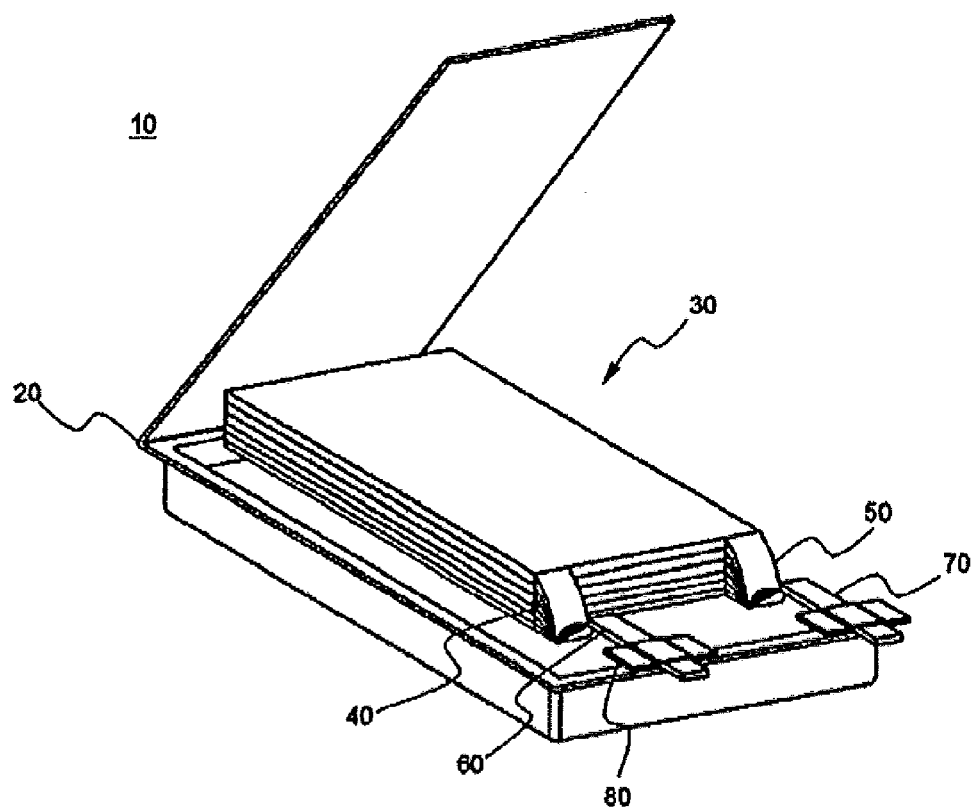
FIG. 1 is an exploded perspective view illustrating the general structure of a conventional pouch-shaped secondary battery.
Figure 2:
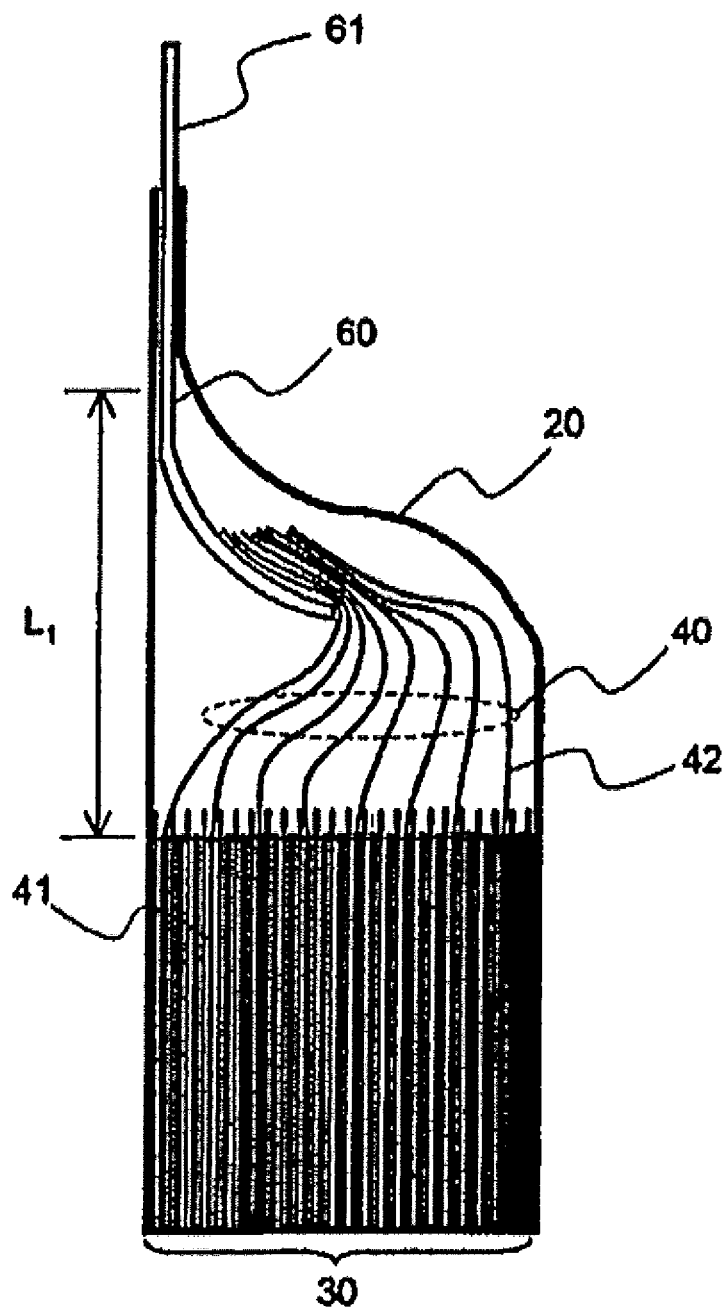
FIG. 2 is an enlarged view, in part, illustrating the inner upper end of a battery case of the secondary battery shown in FIG. 1, in which cathode taps are coupled to each other in a concentrated state and connected to a cathode lead.
Figure 3:
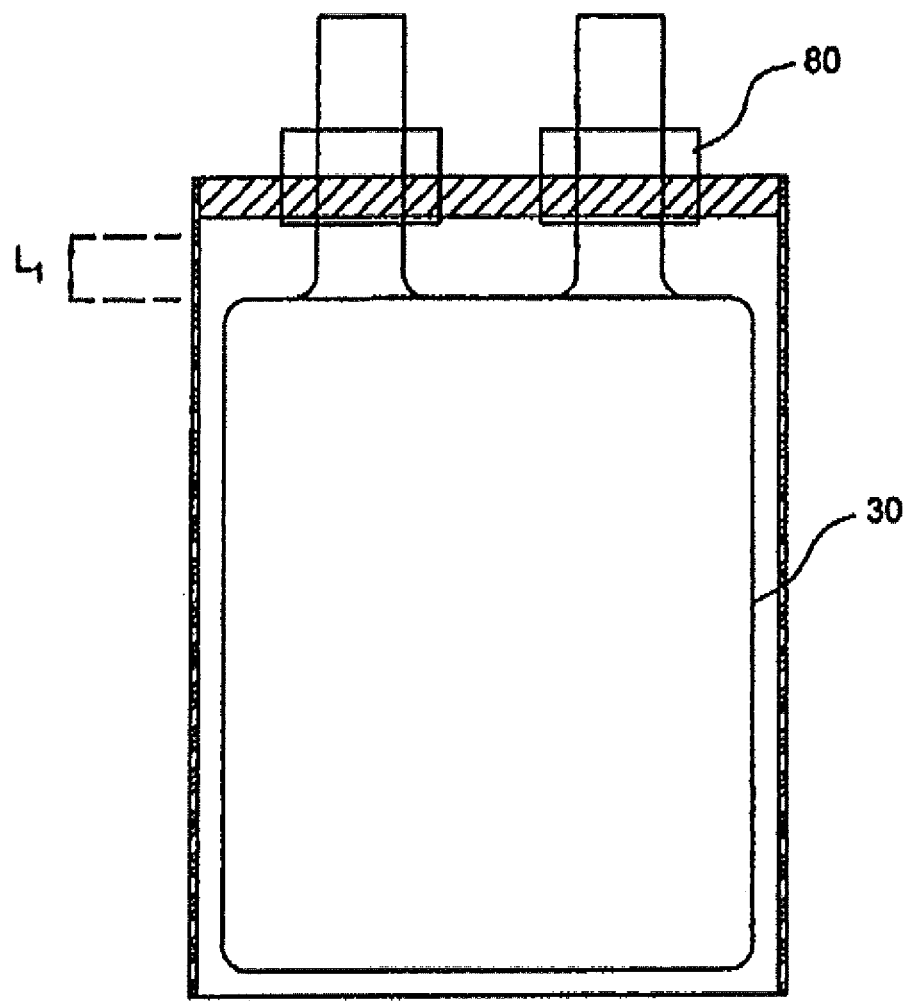
FIG. 3 is a front see-through view illustrating the secondary battery of FIG. 1 in an assembled state.

Before describing the bent structure of the upper-end contact region 230a, the sectional structure of the upper-end contact region 230a previously described in connection with FIGS. 4 and 5 will be further described. The upper-end contact region 230a partially surrounds the plurality of cathode taps 310 protruding from cathodes 301 between the upper case member 210 and the lower case member 220 and the cathode lead 410 connected to the cathode taps 310. Also, the upper-end contact region 230a wholly surrounds the coupling regions 340 between the cathode taps 310 and the cathode lead 410. The cathode taps 310, the cathode lead 410, and the coupling regions 340 between the cathode taps 310 and the cathode lead 410 are surrounded by the insulative film 430. Due to this structure, it can be clearly seen that the distance L2 between the upper end of the electrode assembly 300 and the battery case 200 is considerably reduced as compared with FIG. 2.

The electrode assembly 300 is constructed in a structure in which cathodes 301 and anodes 302 are sequentially stacked one on another while separators are disposed respectively between the cathodes 301 and the anodes 302. In order to prevent lithium ions from being deposited on the surfaces of the anodes 302 during the repetitive charge and discharge of the secondary battery, the anodes 302 have a size greater than that of the cathodes 301. According to circumstances, the separators 303 may have a length enough that the ends of the separators 303 are adjacent to the upper-end contact region 230a or partially overlap with the upper-end contact region 230a. In this case, a possibility of short circuits due to the contact between the cathodes 301 and the anodes 302 is further reduced when the electrode assembly 300 moves toward the upper-end contact region 230a due to the application of an external force.

As shown in FIG. 7, the upper-end contact region 230a is vertically bent such that the coupling region 340 between the cathode taps 310 and the anode taps 410 is parallel with the thickness direction y of the battery, and then some of the protruding end 411 of the electrode lead and the thermal welding part 240 are vertically bent again in parallel with the longitudinal direction x of the battery. According to this bent structure, the protruding end 411 of the electrode lead is bent in parallel with the longitudinal direction x of the battery. Consequently, it is possible to connect a protection circuit module 500 to the electrode lead in the longitudinal direction x of the battery.

As shown in FIG. 8, the upper-end contact region 230a is vertically bent such that the coupling region 340 between the cathode taps 310 and the anode taps 410 is parallel with the thickness direction y of the battery, and then some of the protruding end 411 of the electrode lead and the thermal welding part 240 are horizontally bent in parallel with the thickness direction y of the battery. According to this bent structure, the protruding end 411 of the electrode lead is bent again in parallel with the thickness direction y of the battery. Consequently, it is possible to connect a protection circuit module 500 to the electrode lead in the thickness direction y of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As apparent from the above description, the occurrence of internal short circuits of the secondary battery according to the present invention due to external impacts, such as vibration or dropping, is effectively prevented. Consequently, the safety of the secondary battery according to the present invention is further improved. In addition, the inner space of the battery case is maximally utilized. Consequently, the secondary battery according to the present invention has a capacity higher than conventional secondary batteries having the same size as the secondary battery according to the present invention.

What is claimed is:

1. A secondary battery having an electrode assembly constructed in a structure in which a plurality of electrodes are stacked, while separators are disposed respectively between the electrodes, and electrode taps of the electrodes are connected with each other, the electrode assembly being mounted in a battery case, wherein
regions where the electrode taps are coupled to electrode leads (electrode tap-electrode lead coupling regions) are located at an upper-end contact region of the battery case, and the upper-end contact region is bent in the thickness direction of the battery, whereby the coupling regions are separated from an entire inner space of the battery case; and
wherein the upper-end contact region is a region where the upper ends of upper and lower case members constituting the battery case are in contact with each other.

2. The secondary battery according to claim 1, wherein the coupling regions are disposed adjacent to thermal welding parts to be sealed at the contact region of the battery case.

3. The secondary battery according to claim 2, wherein the thermal welding parts are formed along the edge of the battery case at the upper part of the contact region about the electrode tap-electrode lead coupling regions or in the lateral direction as well as the upper part of the electrode tap-electrode lead coupling regions.

4. The secondary battery according to claim 2, wherein the electrode leads, which protrude from the battery case, and the thermal welding parts are vertically bent again in the longitudinal direction of the battery.

5. The secondary battery according to claim 4, wherein a protection circuit module (PCM) of the battery is connected to the electrode leads in the longitudinal direction of the battery.

6. The secondary battery according to claim 2, wherein the electrode leads, which protrude from the battery case, and the thermal welding parts are horizontally bent again in the thickness direction of the battery.

7. The secondary battery according to claim 6, wherein a protection circuit module of the battery is connected to the electrode leads in the thickness direction of the battery.

8. The secondary battery according to claim 1, wherein insulative films are disposed at the upper-end contact region of the battery case such that the insulative films surround the electrode taps and the electrode leads.

9. The secondary battery according to claim 1, wherein the electrode assembly is constructed in a stacking or stacking/folding type structure.

10. The secondary battery according to claim 1, wherein the separators have a length enough that the ends of the separators are adjacent to the upper-end contact region or partially overlap with the upper-end contact region.

11. The secondary battery according to claim 1, wherein the secondary battery is a lithium ion polymer battery.

12. The secondary battery according to claim 1, wherein the battery case is a pouch-shaped case made of a laminate sheet including a metal layer and a resin layer.

13. The secondary battery according to claim 12, wherein the sheet is an aluminum laminate sheet.

14. A secondary battery having an electrode assembly constructed in a structure in which a plurality of electrodes are stacked, while separators are disposed respectively between the electrodes, and electrode taps of the electrodes are connected with each other, the electrode assembly being mounted in a battery case having an upper case and a lower case, wherein
regions where the electrode taps are coupled to electrode leads (electrode tap-electrode lead coupling regions), the upper case includes a bent region disposed between the coupling regions and the electrode assembly, and the electrode leads are substantially parallel to the electrode assembly.

* * * * *